United States Patent Office.

WILLIAM F. PUTNAM, OF WELLINGTON, OHIO.

FLOUR COMPOUND.

SPECIFICATION forming part of Letters Patent No. 492,969, dated March 7, 1893.

Application filed April 9, 1892. Serial No. 428,522. (No specimens.)

*To all whom it may concern:*

Be it known that I, WILLIAM F. PUTNAM, a citizen of the United States, and a resident of Wellington, county of Lorain, and State of Ohio, have invented certain new and useful Improvements in Flour Compounds, of which the following is a specification, the principle of the invention being herein explained and the best mode in which I have contemplated applying that principle, so as to distinguish it from other inventions.

The following description sets forth, in detail, one form embodying the invention; such form is, however, but one of various forms in which the principle of the invention may be used. In flour or flour compounds, the aim of the miller or manufacturer is to produce a flour or compound which will possess several properties of either actual or fanciful advantage. Thus, there is a demand for a flour having a sharp, gritty or granular feel to the touch and for a white flour, such flour being considered of better quality than flour having a soft feel and a dark color. Besides these rather fanciful qualities, it is desirable to have a flour or compound which will produce bread that will retain its moisture and remain fresh for as long time as possible; which will possess good doughing qualities; which will produce sweet tasting bread, cake or pastry, and which may be produced and sold at a comparatively low price. To attain these advantages, I prepare a flour compound of the following ingredients in substantially the following proportions:—Winter wheat flour eighty-five per cent., spring wheat flour ten per cent., white corn flour five per cent. In this compound the corn flour,—which is added for the purpose of giving gritty feel, whiteness, sweetness, and cheapness to the compound, and for the purpose of retaining moisture in bread made from the compound,—has a tendency to weaken the doughing qualities of the winter wheat flour. This is, however, remedied by adding the spring wheat flour which fully restores to the compound the doughing quality of winter wheat flour.

Bread made from this compound will keep moist and fresh for a comparatively long space of time, will have a fine white appearance, and will have a sweet taste on account of the corn containing a larger percentage of sugar than the wheat.

Other proportions than those herein recited may be employed, and the compound may be varied in several ways without departing from the principles of the invention as recited in the following claims.

I therefore particularly point out and distinctly claim as my invention—

1. A flour compound consisting of winter wheat flour, spring wheat flour and corn flour, substantially as set forth.

2. A flour compound consisting of the following ingredients in substantially the following proportions, viz.—winter wheat flour, eighty-five per cent.; spring wheat flour, ten per cent, and white corn flour, five per cent.

In testimony that I claim the foregoing to be my invention I have hereunto set my hand this 5th day of April, A. D. 1892.

WM. F. PUTNAM.

Witnesses:
WM. SECHER,
L. D. WOOD.